Dec. 14, 1965   M. SIEGEL ETAL   3,222,800
APPARATUS FOR SHRINKING WRAPPERS OF PACKAGES
Filed May 29, 1962   3 Sheets-Sheet 1
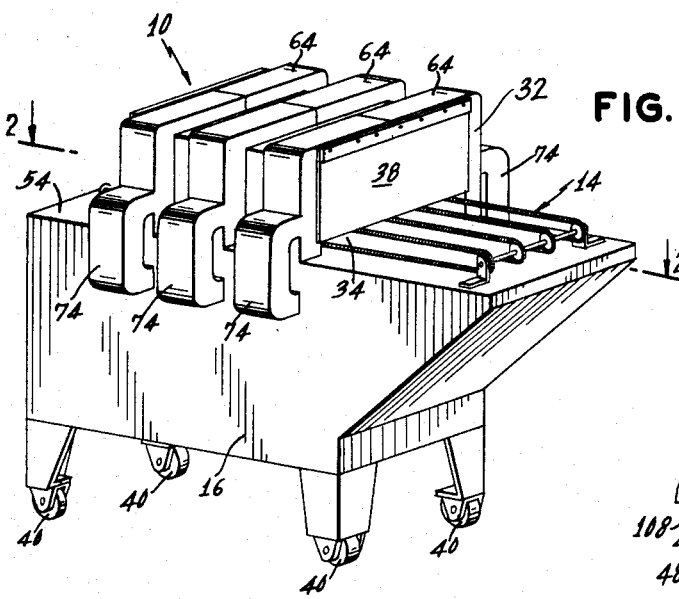
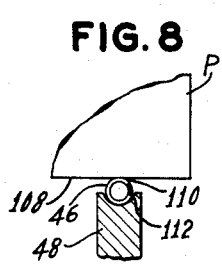
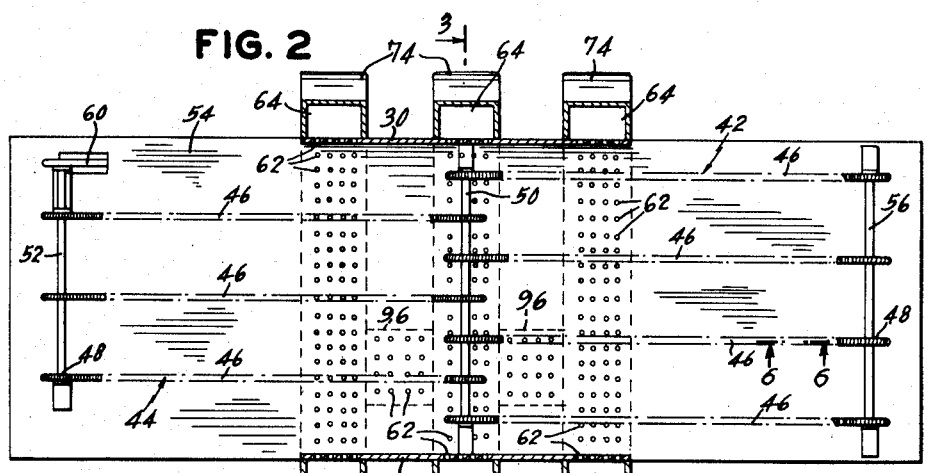
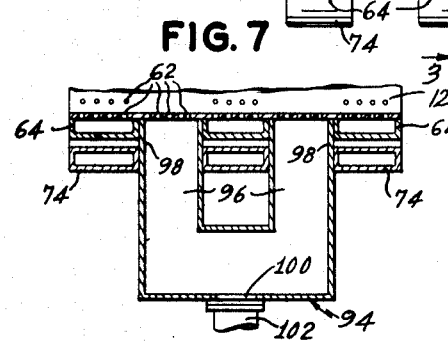
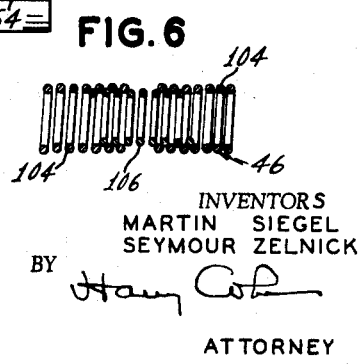
INVENTORS
MARTIN SIEGEL
SEYMOUR ZELNICK
BY
ATTORNEY Dec. 14, 1965   M. SIEGEL ETAL   3,222,800
APPARATUS FOR SHRINKING WRAPPERS OF PACKAGES
Filed May 29, 1962   3 Sheets-Sheet 2

INVENTORS
MARTIN SIEGEL
SEYMOUR ZELNICK
BY
ATTORNEY

Dec. 14, 1965 M. SIEGEL ETAL 3,222,800
APPARATUS FOR SHRINKING WRAPPERS OF PACKAGES
Filed May 29, 1962 3 Sheets-Sheet 3
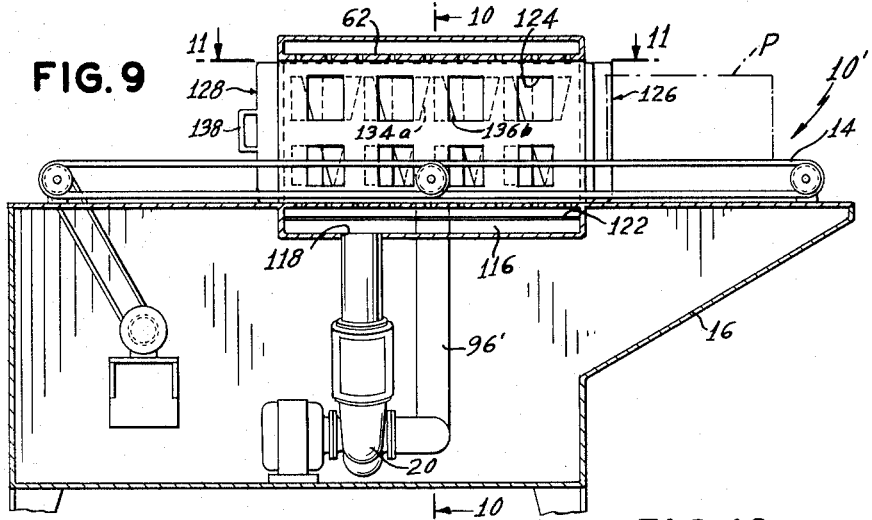
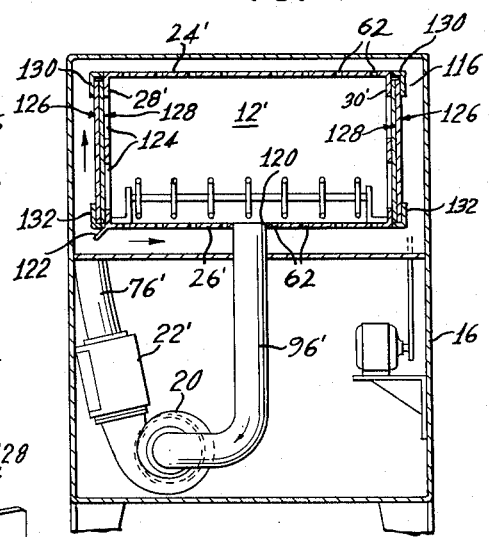
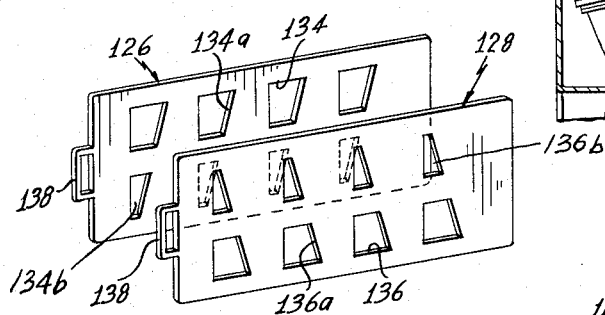
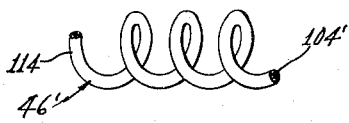
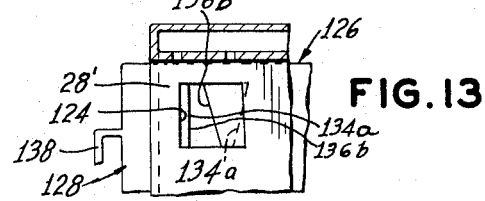
INVENTORS
MARTIN SIEGEL
SEYMOUR ZELNICK
BY
ATTORNEY

United States Patent Office 3,222,800
Patented Dec. 14, 1965

3,222,800
APPARATUS FOR SHRINKING WRAPPERS OF PACKAGES
Martin Siegel, Englewood Cliffs, and Seymour Zelnick, Toms River, N.J., assignors to Weldotron Corporation, Newark, N.J., a corporation of New Jersey
Filed May 29, 1962, Ser. No. 198,540
12 Claims. (Cl. 34—212)

This is a continuation-in-part of Serial No. 170,715, filed February 2, 1962, now abandoned.

This invention relates to the shrinking of heat-shrinkable wrappers of packages.

One of the objects of the present invention is to provide a method and apparatus wherein heated air is directed simultaneously to the top, bottom and sides of the package for heat-shrinking the heat-shrinkable wrapper thereof.

Another object is to provide apparatus having a heating zone through which the packages are conveyed, with means for controlling and directing the flow of heated air to the corners and side edges of the packages for properly shrinking wrappers of packages which vary in height.

Another object is to provide apparatus of the indicated type with improved means for conveying the package through a heating zone whereby the entire bottom supporting surface of the package is exposed to the heated air.

A further object is to provide conveying means for the package of greatly simplified construction and design and yet which has provision for automatically maintaining a predetermined tension in the conveying members of the conveyor.

Another object is generally to provide an apparatus for shrinking the heat-shrinkable wrappers of packages of improved construction and design and which results in a heat-shrunk wrapper which is neat and taut.

The above and other objects, features and advantages of the invention will be more fully understood from the following description of the invention considered in connection with the accompanying drawings which are illustrative of the invention and not in limitation thereof.

In the drawings:

FIG. 1 is a perspective view of the apparatus in accordance with the invention;

FIG. 2 is a top horizontal sectional view, on a larger scale, taken on line 2—2 of FIG. 1;

FIG. 6 is a sectional detail view, on a larger scale, taken on line 6—6 of FIG. 2;

FIG. 7 is a vertical sectional view taken on line 7—7 of FIG. 3;

FIG. 8 is a detail view of part of the apparatus;

FIG. 9 is a vertical side sectional view of another form of the invention;

FIG. 10 is a vertical sectional view taken on line 10—10 of FIG. 9;

FIG. 11 is a horizontal detail sectional view taken on line 11—11 of FIG. 9;

FIG. 12 is a perspective view of companion shutters of the apparatus;

FIG. 13 is a detail vertical view, on a larger scale, taken in the direction of arrow 13, and showing the shutters in another position; and FIG. 14 is a perspective view of another form of part of the apparatus.

Figure 3:
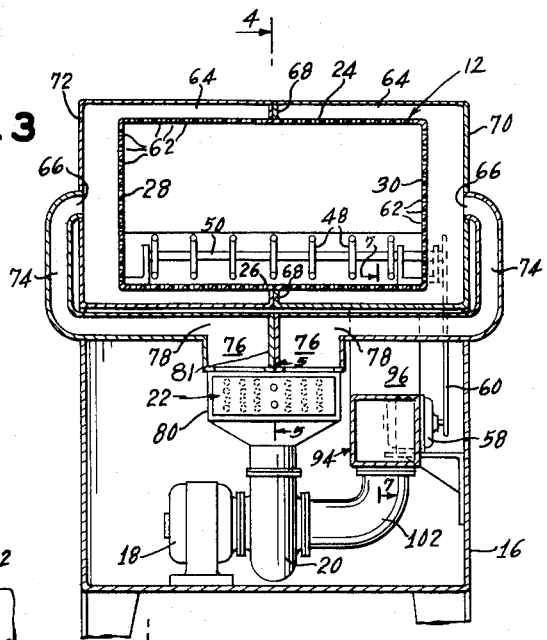
FIG. 3 is a vertical sectional view taken on line 3—3 of FIG. 2.
Figure 5:
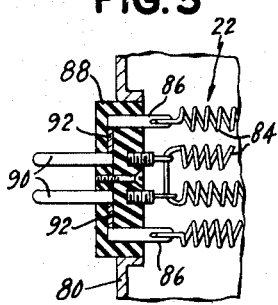
FIG. 5 is a sectional detail view, on a larger scale, taken on line 5—5 of FIG. 3.

Referring now to the drawings in detail and especially to FIGS. 1 to 8, the heat-shrinking apparatus 10 comprises a heating chamber 12, a conveyor 14 for supporting the packages P and conveying them through the chamber for the heat-shrinking operation, and a hollow base 16, generally rectangular in shape, which houses a motor 18 that drives a blower 20, and an electric resistance heater 22 is also located in the base below the heating chamber. The chamber is provided with a top wall 24, a bottom wall 26 and side walls 28 and 30. The opposite end walls 32 of the chamber are provided with an inlet opening 34 and an outlet opening 36 for the packages. The openings are preferably covered with a flaccid material 38 to prevent escape of the heated air from the chamber and yet permit the passage of the package through openings 34 and 36, respectively. The base 16 may be provided with wheels 40 so that the apparatus can be easily moved from place to place.

The conveyor 14 extends longitudinally through chamber 12 and its opposite ends extend from the chamber. The conveyor comprises two separate conveyors 42 and 44 each having a series of endless conveyor members 46 and the adjacent ends of the conveyor members extend over grooved pulleys 48 which are mounted on a common rotary shaft 50. The drive shaft 52 of conveyor 14 is located at one end of the top 54 of the base 16 and the supporting shaft 56 for the opposite end of the conveyor 14 is located at the opposite end of the top of the base, it being noted that the intermediate shaft 50 is positioned within chamber 12. The conveyor members 46 of conveyor 42 are laterally spaced from each other and the package is supported on the upper parts of two or more adjacent members 46. As the package is conveyed through the heating chamber for the heat-shrinking operation, it is transferred from conveyor 42 to conveyor 44 and is supported on members 46 of conveyor 44 which are spaced laterally from members 46 of conveyor 42 so that those portions of the bottom of the package which were previously engaged by the members of conveyor 42 are exposed to the heated air in the rear half of the chamber for proper heating shrinking thereof. The conveyor is driven by the motor 58 whose drive shaft is connected to the conveyor drive shaft 52 by the belt 60. It will be observed that the bottom of the package is above the bottom 26 of chamber 12 whereby the top and sides as well as the bottom of the package are spaced from the walls of the chamber to permit the heated air to envelope the package.

The top 24, bottom 26 and sides 28 and 30 of chamber 12 are provided with openings 62 for the flow of streams of heated air into the chamber from the top, bottom and sides thereof whereby the incoming heated air simultaneously impinges on the top, bottom and sides of the package as it is conveyed through the chamber by the conveyor. In this manner, these surfaces of the package are assured of receiving a sufficient amount of the heated air for proper heat-shrinking of the wrapper of the package and the opposite ends of the packages are simultaneously receiving an adeqaute supply of heated air since the adjacent spaces of the heating chamber at the front and rear of the packages to which the ends of the package are exposed are also continuously receiving heated air through the openings of the walls of the chamber which define said spaces.

Figure 4:
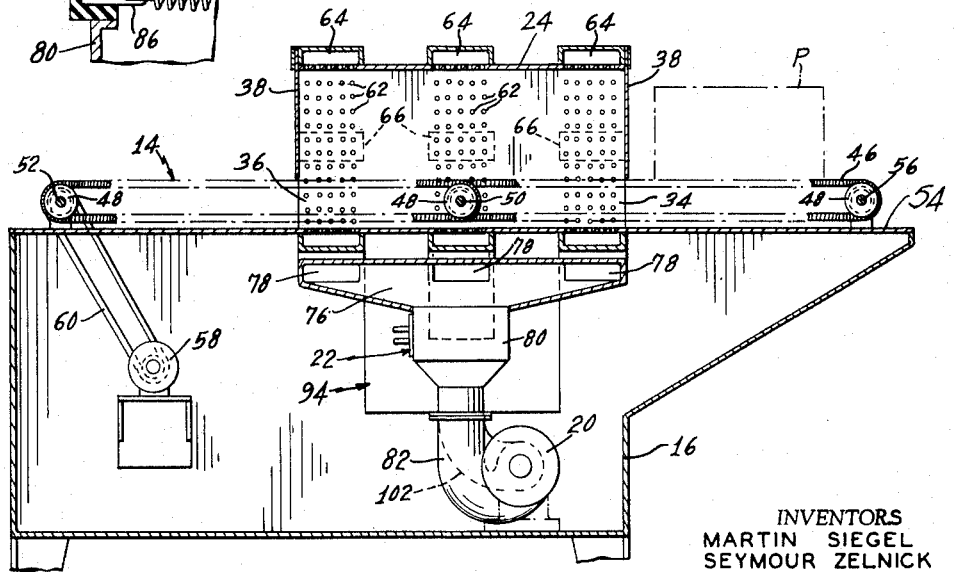
FIG. 4 is a vertical side view taken on line 4—4 of FIG. 3.

A series of laterally spaced air conveying ducts 64 surround the chamber and extend along the top, bottom and sides of the chamber and are spaced from each other in a direction which extends longitudinally of the chamber. The cross section of the ducts is generally rectangular and the sides of the ducts are each provided with inlet openings 66 for the heated air. Each duct is preferably divided by partitions 68 into two sections 70 and 72. The heated air is conveyed to the inlets 66 by duct 74 which extends from opening 66 downwardly below the componion duct 64 and then inwardly toward heater chamber 76 with which it is in fluid flow communication via openings 78. Heater chamber 76 extends longitudinally of heating chamber 12 and ducts 74 in communication with chamber 76 at its sides through the openings 78, as best seen in FIGS. 3 and 4. The electric resistance heater 22 is positioned in a chamber 80 which is connected to the bottom of chamber 76 and is in fluid flow communication with the latter chamber. A duct 82 connects the outlet of the blower to the inlet of chamber 80 and the incoming air passes over the exposed electric resistance wires 84 (FIG. 5) and are heated. The heated air enters chamber 76 at both sides of the dividing partition 81 and from there is distributed to the various ducts 74 and from said ducts into the companion duct 64 and into chamber 12 through the openings 62.

The heating wires 84 of heater 22 may be connected in series and their opposite ends connected to electrically conducting members 86 (FIG. 5) which are mounted in an electrically non-conducting socket part 88. The socket part is provided with a pair of contacts 90 and members 86 are in electrically transmitting relation therewith by the conductors 92. Power may be easily transmitted to the heater by connecting contacts 90 to a suitable electric supply plug.

The heated air, after it has passed over the surfaces of the package, is withdrawn from chamber 12 by a generally U-shaped duct 94 whose arms 96 are disposed between pairs of spaced ducts 64. The upper ends 98 of the arms are open and are in communication with the openings 62 of the adjacent portions of the bottom of chamber 12. The outlet opening 100 at the bottom of duct 94 is connected to the inlet of blower 20 by a duct 102. In this manner the air is continuously withdrawn from the bottom of chamber 12 by the action of the blower and is reheated and thereafter reintroduced into the heating chamber 12.

Referring now more specifically to the conveyor 14 and especially to the conveyor members 46, each member is endless and extends longitudinally of heating chamber 12 and is resiliently stretchable along its length so that any slack which would normally occur in the member because of use is automatically compensated for by the resilience of the member, whereby a predetermined and substantially constant tension is maintained in the member. More particularly, each member 46 consists of a helically wound coil of wire 104 whose ends are connected to each other by a coupling 106 which is also a helically wound coil of wire whose outside diameter is such that the opposite ends of the coupling can be screwed into the companion ends of the conveyor member 46. It will be observed that the resilient stretchability of the conveyor members 46 is provided by the ability of the convolutions of the helically wound coil to move longitudinally with respect to each other as in a coil spring.

As best seen in FIG. 8, the bottom 108 of the package P is flat and is supported on the upper curved parts 110 of the convolutions of the wire 104 to provide a point contact between the bottom of the package and the conveying member 46. This point contact permits exposure of most of the bottom of the package to the heated air and thereby improves the heat shrinking thereof. The relatively small area of the bottom of the package which is engaged by the helical coil is exposed to the heated air when the package is transferred from conveyor 42 to conveyor 44 since the conveyor members of conveyor 44 are laterally spaced with respect to the conveyor members of conveyor 42. The periphery of the pulleys 48 is provided with a circumferentially extending semi-circular groove 112 in which the conveyor coil members 46 are supported and the friction resulting from tension of the members permit them to be driven by the grooved pulleys on shaft 52.

FIG. 14 illustrates another form of the conveyor member 46' which comprises a helical coil spring 104' covered with an outer sheath of a resiliently flexible material 114, for example a suitable plastic material, which provides a friction surface between the bottom of the package and the conveyor members.

Referring now to FIGS. 9 to 13, there is shown another form of heat-shrinking apparatus 10' which has provision for directing the heated air to the corners and side edges of the package which require additional heating, especially in the case of tall packages, in order to provide a taut and neat wrapping, free of wrinkles. The heating chamber 12' is encased in a heated air distribution sleeve 116 which surrounds the top 24', bottom 26' and sides 28' and 30' of the chamber for delivering heated air thereto which is supplied through inlet opening 118 provided in the distribution sleeve. The blower 20 withdraws air from the bottom of chamber 12', through outlet opening 120, and transmits it through duct 96', through electric heater 22', duct 76', and into the sleeve through its inlet opening 118. A baffle 122 extends longitudinally of the sleeve for directing the air through the sleeve in the directions indicated by the arrows shown in FIG. 10.

The sides 28' and 30' of the chambers are each provided with upper and lower rows of longitudinally spaced rectangular openings 124. A pair of longitudinally slidable shutters 126 and 128 are positioned adjacent the outer surface of each side of the chamber and are supported in said position by any suitable means for example the longitudinally extending upper and lower brackets 130 and 132, respectively, which are secured to the upper and lower outer side edges of the chamber. The shutters are identical in construction but one shutter has been rotated 180° about a vertical axis with respect to the other so that the longitudinally spaced trapezoidal-shaped openings 134, in the case of shutters 126, and similar openings 136, in the case of shutters 128, are arranged with respect to each other as shown. Handles 138 are provided for moving the shutters with respect to each other.

The openings 134 and 136 are in registry with the openings 124 of the sides of the heating chamber and it will be apparent that the sizes of openings 124 can be varied by moving the shutters with respect to each other and openings 124. More particularly, it will be noted that shutter 126 has an upper row of openings 134a and a lower row of similarly shaped but smaller openings 134b. Shutter 128 has a lower row of openings 136a and an upper row of similarly shaped but smaller openings 136b. By moving the shutters with respect to each other the sizes of upper openings 124 and lower openings 124 can be varied with respect to each other and due to the trapezoidal shapes of the openings 134 and 136 of the shutters, the vertical positions of the resulting openings 124 can also be varied, so that the quantity of heated air, as well as the vertical positions at which the air is introduced into the chamber, can be varied over a wide range to accommodate various heights and sizes of packages.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

We claim:

1. Apparatus for shrinking heat-shrinkable wrappers of packages, comprising:

(a) a heating chamber having a top, bottom, sides and opposite open ends for the passage of the package through the chamber, (b) conveyor means positioned in said chamber and extending from said open ends for moving the package through said heating chamber, (c) said conveyor means comprising a series of laterally spaced longitudinally extending conveyor members for supporting the package, each of said conveyor members being a helically wound coil of wire connected at its ends to form an endless member which is resiliently stretchable along its length, and (d) a series of laterally spaced ducts surrounding said chamber and extending along said top, bottom and sides of said chamber for simultaneously transmitting heated air to said top, bottom and sides of said chamber as the package passes therethrough, (e) said top, bottom and sides of said chamber having a series of openings for the flow of said heated air from said ducts into said chamber, whereby the heated air simultaneously impinges on the top, bottom and sides of the package for the wrapper heat-shrinking operation.

2. Apparatus for shrinking heat-shrinkable wrappers of packages, comprising:

(a) a heating chamber having a top, bottom, sides and opposite open ends for the passage of the package through the chamber, (b) conveyor means positioned in said chamber and extending from said open ends for moving the package through said heating chamber, (c) said conveyor means comprising a series of laterally spaced longitudinally extending conveyor members, each of said conveyor members being resiliently stretchable along its length, (a) a series of laterally spaced ducts surrounding said chamber and extending along said top, bottom and sides of said chamber for simultaneously transmitting heated air to said top, bottom and sides of said chamber as the package passes therethrough, (e) said top, bottom and sides of said chamber having a series of openings for the flow of said heated air from said ducts into said chamber, whereby the heated air simultaneously impinges on the top, bottom and sides of the package for the wrapper heat-shrinking operation, and (f) means disposed between said spaced ducts for transmitting heated air from said chamber for the reheating thereof.

3. Apparatus for shrinking heat-shrinkable wrappers of packages, comprising:

(a) a heating chamber having a top, bottom, sides and opposite open ends for the passage of the package through the chamber, (b) conveyor means positioned in said chamber and extending from said open ends for moving the package through said heating chamber, (c) said conveyor means comprising a series of laterally spaced longitudinally extending conveyor members, each of said conveyor members being resiliently stretchable along its length, (d) a series of laterally spaced ducts surrounding said chamber and extending along said top, bottom and sides of said chamber for simultaneously transmitting heated air to said top, bottom and sides of said chamber as the package passes therethrough, (e) said top, bottom and sides of said chamber having a series of openings for the flow of said heated air from said ducts into said chamber, whereby the heated air simultaneously impinges on the top, bottom and sides of the package for the wrapper heat-shrinking operation, and (f) means disposed between said spaced ducts and connected to said bottom of said chamber for transmitting heated air from said chamber for the reheating thereof.

4. In an apparatus for shrinking heat-shrinkable wrappers of packages by directing heated air thereagainst, a heating chamber including top, bottom, and side walls and opposite open ends for the passage of packages through the chamber, conveyor means positioned in said heating chamber and extending from said open ends for moving packages through said heating chamber, said conveyor means comprising a series of laterally spaced longitudinally extending conveyor members, each of said conveyor members being resiliently stretchable along its length, duct means for guiding heated air into contact with the said heating chamber, said duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation, and heated air supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said inlet means being connected to said heating chamber through the bottom wall thereof at a location between at least some of the openings formed in said bottom wall and out of direct communication with said passage, whereby heated air may be withdrawn from said chamber for transmission, isolated from the heated air in said passage, back to the heated air supply means.

5. In an apparatus as in claim 4, wherein said duct means walls are substantially coextensive with said heating chamber walls.

6. In an apparatus as in claim 4, wherein said outlet means are connected to said passage through the bottom wall thereof and at least one wall of said heating chamber includes baffle means extending therefrom into said passage adjacent the connection of the heated air supply outlet means thereto for directing the flow of heated air in at least two directions within said passage.

7. In an apparatus for shrinking heat-shrinkable wrappers of packages by directing heated air thereagainst, a heating chamber including top, bottom and side walls and opposite open ends for the passage of packages through the chamber, conveyor means positioned in said heating chamber and extending from said open ends for moving packages through said heating chamber, said conveyor means comprising a series of laterally spaced longitudinally extending conveyor members, each of said conveyor members being resiliently stretchable along its length, duct means for guiding heated air into contact with the said heating chamber, said duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation and heated air supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said openings in said side walls of the heating chamber being formed in longitudinally spaced upper and lower rows, and shutter means cooperatively associated with said openings for controlling the size and vertical positions thereof with reference to each other so that the quantity and position at which said heated air is introduced into said chamber can be varied to accommodate different heights and sizes of packages.

8. In an apparatus for shrinking heat-shrinkable wrappers of packages by directing heated air thereagainst, a hollow base member with a chamber formed therein, a heating chamber positioned on said base member, said heating chamber including top, bottom, and side walls and opposite open ends for the passage of packages through the chamber, conveyor means positioned in said heating chamber and extending from said open ends for moving packages through said heating chamber, said conveyor means comprising a series of laterally spaced longitudinally extending conveyor members, each of said conveyor members being resiliently stretchable along its length, duct means for guiding heated air into contact with the said heating chamber, said duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation, and heated air supply means positioned within said base member chamber, said supply means including outlet and inlet means extending therefrom with said outlet means being operatively connected to said passage for the transmission of heated air thereto and said inlet means being operatively connected to said chamber for the withdrawal of heated air therefrom and transmission to the heated air supply means for the reheating thereof.

9. In an apparatus for shrinking heat-shrinkable wrappers of packages by directing heated air thereagainst, a hollow base member with a chamber formed therein, a heating chamber positioned on said base member, said heating chamber including top, bottom, and side walls and opposite open ends for the passage of packages through the chamber, conveyor means positioned in said heating chamber and extending from said open ends for moving packages through said heating chamber, said conveyor means comprising a series of laterally spaced longitudinally extending conveyor members, each of said conveyor members being resiliently stretchable along its length, duct means for guiding heated air into contact with said heating chamber, said duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air, the heated air simultaneously impinges on the top, bottom and sides of the package for the wrapper heat-shrinking operation, and heated air supply means positioned within said base member chamber, said supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said inlet means being connected to said heating chamber through the bottom wall thereof at a location between at least some of the openings formed in the said wall, and out of direct communication with said passage, whereby heated air may be withdrawn from said chamber for transmission, isolated from the heated air in said passage, back to the heated air supply means.

10. In an apparatus for shrinking heat-shrinkable wrappers of packages by directing heated air thereagainst, a hollow base member with a chamber formed therein, a heating chamber positioned on said base member, said heating chamber including top, bottom, and side walls and opposite open ends for the passage of packages through the chamber, conveyor means positioned in said heating chamber and extending from said open ends for moving packages through said heating chamber, said conveyor means comprising a series of laterally spaced longitudinally extending conveyor members, each of said conveyor members being resiliently stretchable along its length, duct means for guiding heated air into contact with said heating chamber, said duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation, and heated air supply means positioned within said base member chamber, said supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said inlet means being connected to said heating chamber through the bottom wall thereof at a location between at least some of the openings formed in the said wall, and out of direct communication with said passage, whereby heated air may be withdrawn from said chamber for transmission, isolated from the heated air in said passage, back to the heated air supply means, said outlet means being connected to said passage through the bottom wall thereof, at least one wall of said heating chamber including baffle means extending therefrom into said passage adjacent the connection of the heated air supply outlet means thereto for directing the flow of heated air in at least two directions in said passage, said openings in said side walls of the heating chamber being formed in longitudinally spaced upper and lower rows, and shutter means cooperatively associated with said openings for controlling the size and vertical positions thereof with reference to each other so that the quantity and position at which said heated air is introduced into said chamber can be varied to accommodate different heights and sizes of packages.

11. In an apparatus for shrinking heat-shrinkable wrappers of packages by directing heated air thereagainst, a heating chamber including top, bottom, and side walls and opposite open ends for the passage of packages through the chamber, conveyor means positioned in said heating chamber and extending from said open ends for moving packages through said heating chamber, duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation, and heated air supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said inlet means being connected to said heating chamber at a location between at least some of the openings formed in said bottom wall and out of direct communication with said passage, whereby heated air may be withdrawn from said chamber for transmission, back to the heated air supply means.

12. In an apparatus for shrinking heat-shrinkable wrappers of packages by directing heated air thereagainst, a heating chamber including top, bottom, and side walls and opposite open ends for the passage of packages through the chamber, conveyor means positioned in said heating chamber and extending from said open ends for moving packages through said heating chamber, duct means comprising top, bottom and side walls which substantially surround the respective top, bottom and side walls of the heating chamber and are spaced therefrom to form therebetween a passage for the flow of heated air, said top, bottom and side walls of said heating chamber having formed therein a series of openings for the flow of said heated air from said passage into said chamber whereby the heated air simultaneously impinges on the top, bottom and sides of the package for the wrapper heat-shrinking operation, and heated air supply means including outlet and inlet means extending therefrom with said outlet means being operatively connected to said passage for the transmission of heated air thereto and said inlet means being operatively connected to said chamber for the withdrawal of heated air therefrom and transmission back to the heated air supply means for the reheating thereof, said inlet means being connected to said heating chamber at a location between at least some of the openings formed in said bottom wall and out of direct communication with said passage, whereby heated air may be withdrawn from said chamber for transmission back to the heated air supply means, said connection of the air inlet means to said heating chamber being within said heating zone and remote from said ends of said heating chamber.

References Cited by the Examiner

UNITED STATES PATENTS

| | | | |
|---|---|---|---|
| 1,700,994 | 2/1929 | Buck | 34—225 |
| 2,446,822 | 8/1948 | Grapp | 34—233 |
| 2,453,568 | 11/1948 | Calleia | 34—233 |
| 2,880,847 | 4/1959 | Kelley | 198—190 |
| 2,906,627 | 9/1959 | Payton | 53—184 |
| 2,907,118 | 10/1959 | Maescher | 34—216 |

FOREIGN PATENTS

| | | |
|---|---|---|
| 1,039,479 | 5/1953 | France. |
| 17,199 | 12/1887 | Great Britain. |

WILLIAM F. O'DEA, *Primary Examiner.*

NORMAN YUDKOFF, *Examiner.*